United States Patent [19]

Fox

[11] Patent Number: 4,642,040
[45] Date of Patent: Feb. 10, 1987

[54] EXTRUDER DRIVINGLY CONNECTED TO GEAR PUMP

[75] Inventor: Steve A. Fox, Hickory, N.C.

[73] Assignee: Normag Corporation, Hickory, N.C.

[21] Appl. No.: 768,574

[22] Filed: Aug. 23, 1985

[51] Int. Cl.[4] .............................................. B29B 47/00
[52] U.S. Cl. .................................. 425/204; 264/40.7; 264/176.1; 425/208; 425/376 R
[58] Field of Search ................... 425/204, 205, 376 A, 425/376 B, 161, 331, 376 R; 264/40.3, 40.7, 176 R, 176 F

[56] References Cited

U.S. PATENT DOCUMENTS

| | | | |
|---|---|---|---|
| 1,892,217 | 12/1932 | Moineau | 74/458 |
| 2,028,407 | 1/1936 | Moineau | 418/48 |
| 2,680,880 | 6/1954 | Corbett | 425/192 R |
| 2,947,598 | 8/1960 | Maragliano et al. | 264/176 F |
| 3,376,603 | 4/1968 | Colombo | 425/203 |
| 4,171,193 | 10/1979 | Rahlfs | 425/71 |
| 4,336,213 | 6/1982 | Fox | 264/40.1 |
| 4,461,734 | 7/1984 | Jones et al. | 264/176 R |
| 4,519,712 | 5/1985 | Barr | 366/77 |
| 4,558,954 | 12/1985 | Barr | 366/90 |

*Primary Examiner*—Donald Czaja
*Assistant Examiner*—Jennifer E. Cabaniss
*Attorney, Agent, or Firm*—Bell, Seltzer, Park & Gibson

[57] ABSTRACT

An apparatus for accurately metering a viscous material is provided. The apparatus includes an extruder having a drive means, and a gear pump, with the extruder drivingly connected to the gear pump so as to obviate the need for a secondary power system. Three different embodiments of the invention are set forth.

16 Claims, 6 Drawing Figures

EXTRUDER DRIVINGLY CONNECTED TO GEAR PUMP

BACKGROUND OF THE INVENTION

This invention relates to an apparatus for extruding a metered quantity of a viscous material. In this apparatus, an extruder is drivingly connected to a positive displacement pump such as a gear pump so as to obviate the need for a secondary power and drive system for the gear pump.

Conventional extruders comprise an elongate, heated barrel having one or more rotatable extruder screws disposed therein. Pellets or granules of a material such as plastic are delivered into one end of the extruder barrel, and the plastic is heated and melted as it is forced along the length of the barrel by the rotation of the screws. The delivery end of the barrel usually mounts a suitable die so that the extruded material, or extrudant, may be formed into a desired cross-sectional configuration as it leaves the barrel.

Such prior extruding machines are in widespread use. However, difficulties are encountered when it is desired to extrude a product of very acurate cross-sectional configuration because the output pressure of the extruder inherently varies. Thus the pressure of the material passing through the die varies, and this in turn results in the extruded product having varying dimensions along its length. As an example, in extruding plastic film, it is common for the thickness to vary from between 6 to 10%. As a result, additional material must be extruded to ensure that the minimum thickness tolerance is maintained. This ultimately results in the film being thicker than necessary in most of its area, and a significant amount of the plastic is thus wasted.

This problem has previously been overcome by interposing a positive displacement pump as a gear pump between the extruder and the die. One example of such an apparatus for metering extremely viscous materials at very high pressures is disclosed in U.S. Pat. No. 4,336,213 to the present inventor. Other representative examples of apparatus in which a gear pump is interposed between an extruder and a die are disclosed in U.S. Pat. No. 2,680,880 to Corbett, U.S. Pat. No. 4,171,193 to Rahlfs, and U.S. Pat. No. 4,461,734 to Jones et al.

Apparatus of this type has not been driven from the extruder itself; instead, a separate motor, controller, and drive train for the pump have been provided. Such a drive system, however, is so expensive that the cost of outfitting an extruder with a positive displacement pump is much greater than the cost of the pump alone. It is, therefore, an object of the present invention to provide a positive displacement pump which can be operatively associated with an extruder at a greatly reduced cost. It is a further object of the present invention to provide a positive displacement pump which can be interposed between an extruder and a die without requiring the installation of a completely separate drive system. Other objects and advantages of the invention will be particularly identified below.

SUMMARY OF THE INVENTION

In accordance with the present invention, an apparatus is provided which comprises a gear pump connected in tandem with the delivery end of an extruder in which the gear pump is drivingly connected to the extruder. This eliminates the need for a completely separate drive system, yet continues to provide a means for accurately metering the extrudant.

The gear pump comprises an enclosed housing having inlet port means and discharge port means, gear means rotatably mounted within the housing to convey the viscous material from the inlet port means to the discharge port means, and a shaft extending through the housing and operatively connected to the gear means for transmitting rotational torque to the same. In one preferred embodiment, the gear pump is drivingly connected to the delivery end of the extruder screw. In a second preferred embodiment, the gear pump is drivingly connected to the drive means of the extruder through a drive shaft running alongside the extruder screw. In a third preferred embodiment, a shaft is connected to the delivery end of the extruder screw so that it extends forward therefrom, and the gear pump is offset and drivingly connected to the shaft.

In all embodiments, a filtering screen is desirably placed between the delivery end of the extruder and the gear pump to prevent impurities from reaching the gear pump. In addition, a recirculating bypass, which takes extrudant from the delivery end of the extruder screw and returns it to the intake end of the extruder screw, can be provided. This bypass equalizes the pressure of the extrudant at the delivery end of the extruder screw. Other features of the preferred embodiments will be pointed out in the following detailed description of the invention.

DETAILED DESCRIPTION OF THE INVENTION

Three different embodiments of the present invention will be explained in detail below. This invention can, however, be embodied in many different forms, and should not be construed as limited to the embodiments set forth herein; rather, applicant provides these three embodiments so that this disclosure will be thorough and complete, and will fully convey the scope of the invention to those skilled in the art.

FIRST EMBODIMENT

Figure 1:
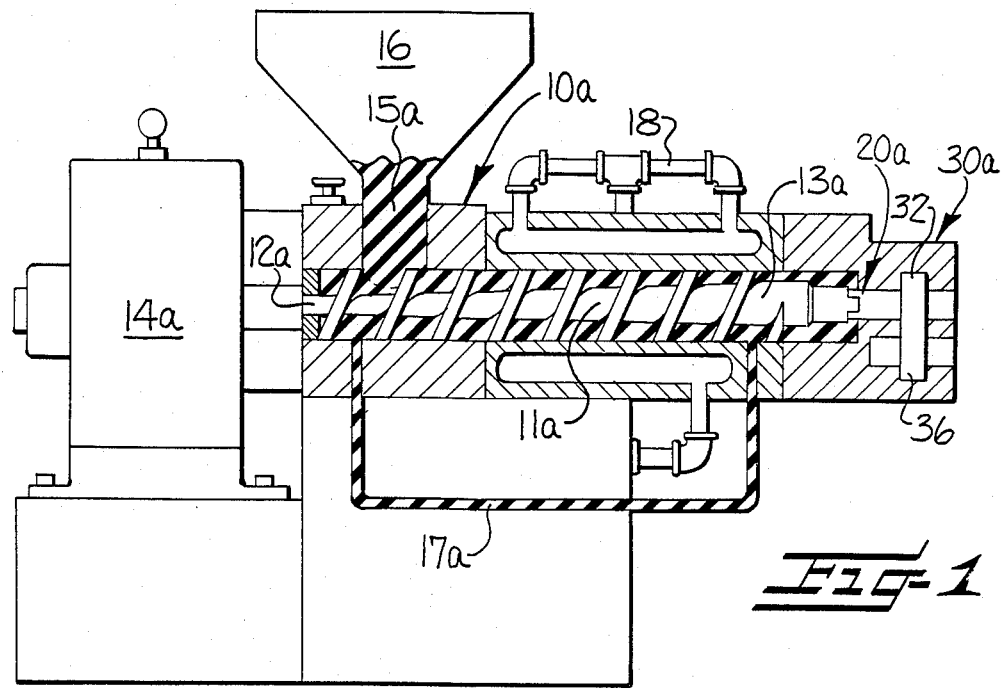
FIG. 1 is a side sectional view of a first embodiment of an extruder drivingly connected to a gear pump.

FIG. 1 presents a side cut away view of an extrusion apparatus of the first embodiment of the present invention. A conventional extruder 10a contains an extruder screw 11a having an intake end 12a and a delivery end 13a. The extruder screw 11a is rotated by drive means 14a, which is connected to the intake end 12a of the extruder screw. The extrudant 15a is supplied to the intake end of the extruder screw in pellet form by means of a hopper 16. In order to equalize the pressure of the extrudant at the delivery end 13a of the extruder screw, recirculating bypass means 17a are provided, which takes excess extrudant from the delivery end of the extruder screw and returns it to the intake end 12a of the extruder screw. A heating system 18 for the extrudant as it moves along the extruder screw is also provided. A positive displacement pump such as a gear pump 30a is connected in tandem to the extruder at the delivery end of the extruder screw.

Figure 2:
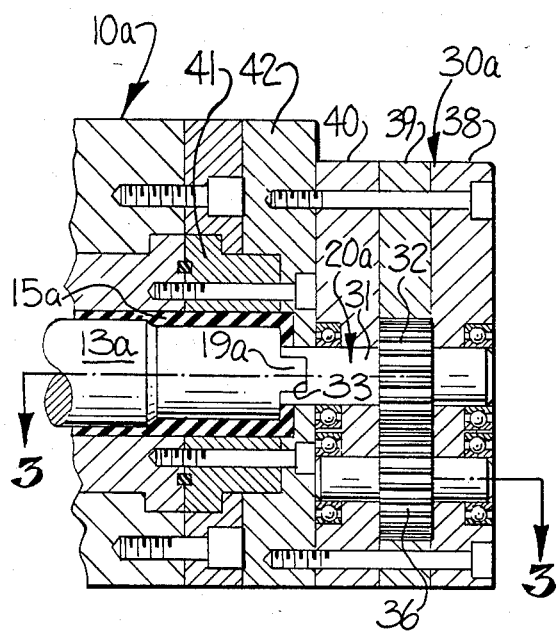
FIG. 2 is a side sectional view showing the details of the gear pump in the first embodiment of the present invention.

The details of the driving connection 20a between the extruder 10a and the gear pump 30a can be best understood with reference to FIG. 2. The delivery end 13a of the extruder screw ends in a tang 19a. The gear pump 30a has a drive shaft 31 in axial alignment with and rigidly connected to a driven gear 32, into one end of which is cut a slot 33 (see also FIG. 4). The extruder screw tang 19a is fitted into the slot 33 of the gear pump drive shaft so that the drive shaft 31 is rotatably driven by the delivery end of the extruder screw 13a.

Figure 3:
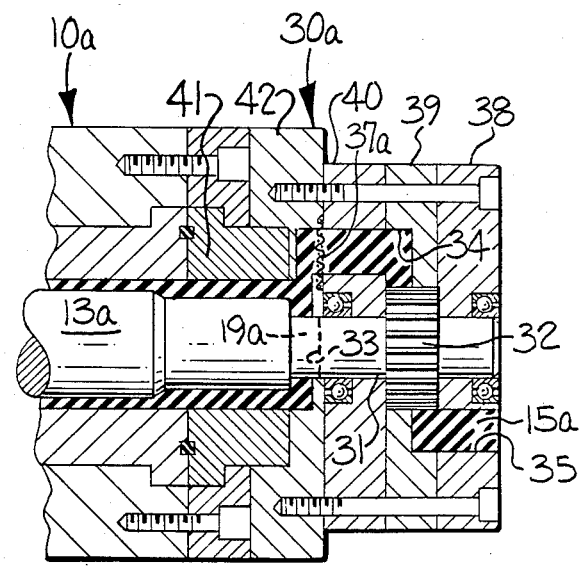
FIG. 3 is a top sectional view of the first embodiment of the present invention taken substantially along the line 3—3 of FIG. 2.
Figure 4:
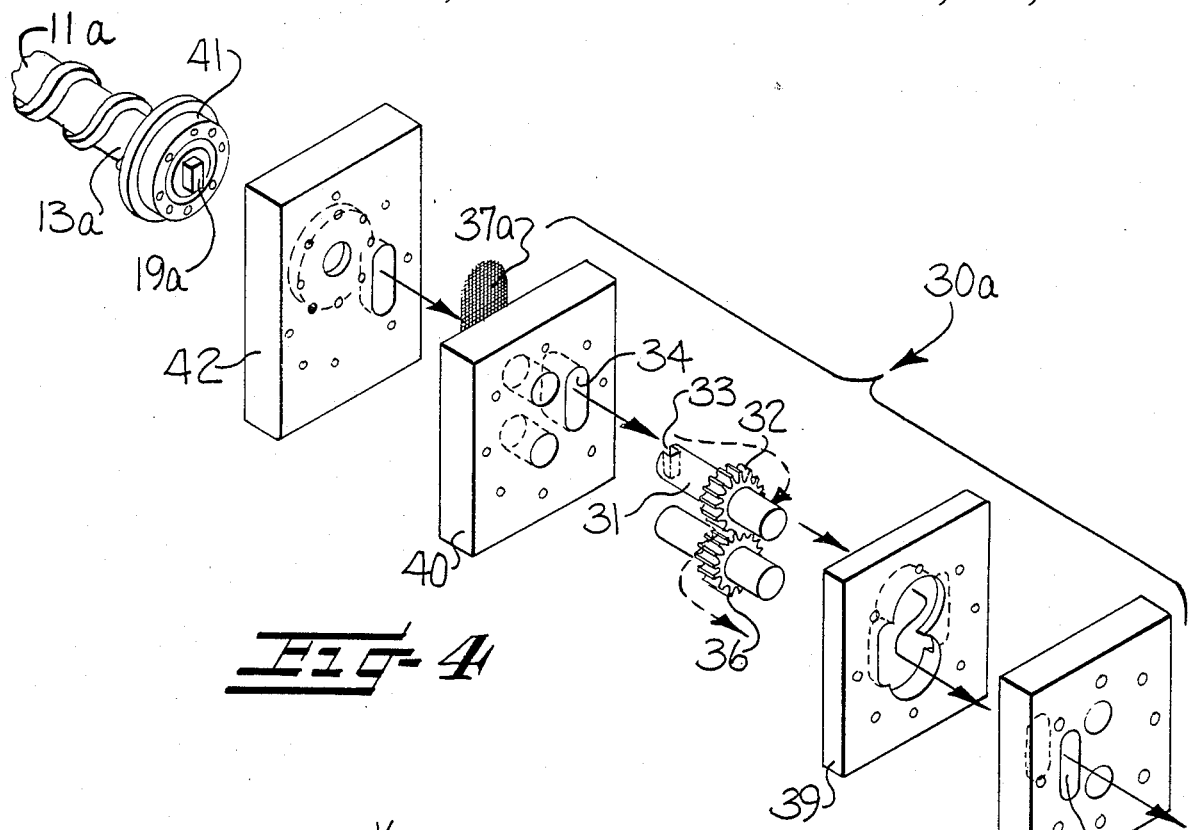
FIG. 4 is an exploded perspective view showing the details of the gear pump in the first embodiment of the present invention.

The path of the extrudant 15a is illustrated in FIGS. 3 and 4. The gear pump is provided with an inlet port 34 and an outlet port 35. Extrudant 15a is supplied to the inlet port 34 by the delivery end 13a of the extruder screw, carried through the teeth of the gear pump gears 32, 36, and expelled through the outlet port 35. Gear pump gears 32 and 36, as shown in the drawings (see particularly FIGS. 2 and 4), are mounted so as to intermesh and cooperatively counterrotate with each other. In order to prevent impurities in the extrudant from passing through the gear pump, a filter screen 37a is desirably installed.

FIG. 4 illustrates additional details of the gear pump construction and mounting. The gear pump is enclosed in a housing comprised of three plates 38, 39, 40. A mounting plate 41 is secured to the end of the extruder, and the gear pump 30a and mounting plate are joined together through a transition plate 42 (see also FIGS. 2 and 3).

Those skilled in the art will recognize that the gear pump must be designed so that the delivery rate of the gear pump is compatible with the delivery rate of the extruder, and will understand the routine by which such a result is achieved.

SECOND EMBODIMENT

Figure 5:
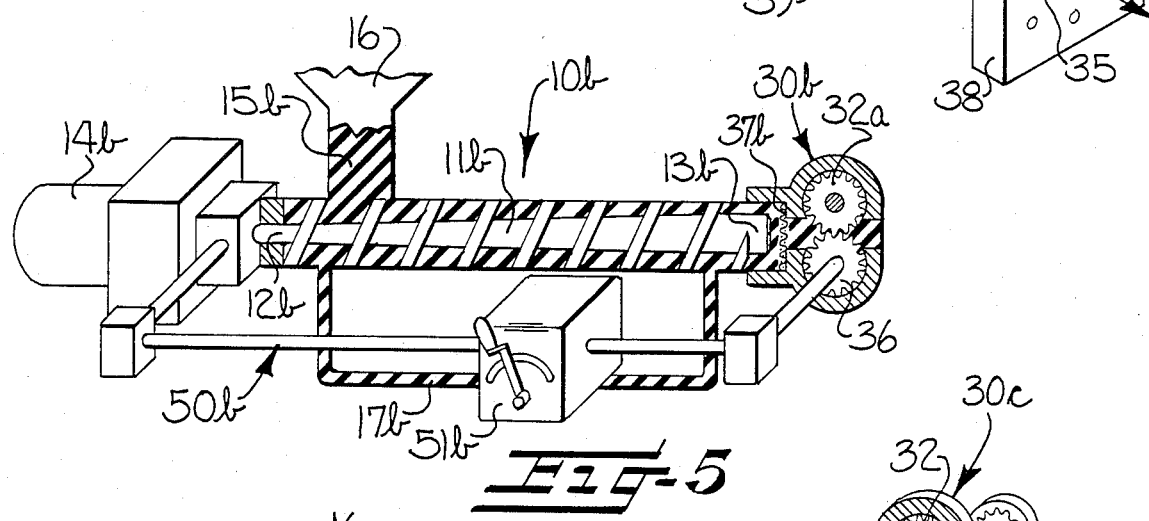
FIG. 5 is a side sectional and partially shcematic view of a second embodiment of the present invention.

Making reference to FIG. 5, a second embodiment of the invention comprises an extruder 10b, an extruder drive means 14b, a gear pump 30b connected in tandem with the extruder, and drive means 50b extending alongside the extruder drivingly connecting the gear pump 30b to the extruder drive means 14b.

The extruder 10b is again comprised of an extruder screw 11b having an intake end 12b and a delivery end 13b, with extrudant 15b being moved from the intake to delivery end thereby. Recirculating bypass means 17b and a filter screen 37b are also desirably provided. An advantage of this embodiment is that means 51b for varying the speed of the gear pump may be added to the drive means 50b.

THIRD EMBODIMENT

Figure 6:
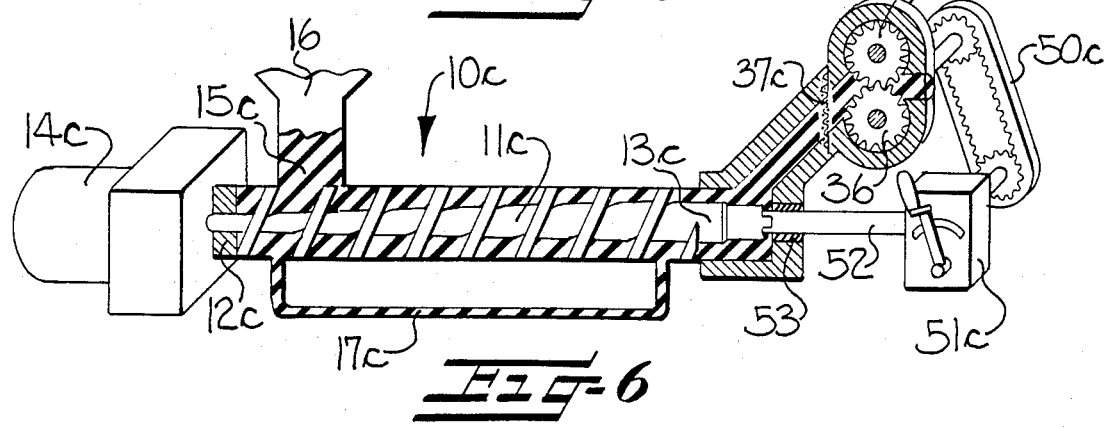
FIG. 6 is a side sectional and partially schematic view of a third embodiment of the present invention.

A third embodiment of the invention is disclosed in FIG. 6. As in the previous embodiments, an extruder 10c having an extruder screw 11c and an extruder drive means 14c transfers extrudant 15c from the intake end 12c to the delivery end 13c of the extruder screw. The gear pump 30c is again connected in tandem to the extruder 10c. Recirculating bypass means 17c and a filter screen 37c may optionally be provided.

In this embodiment, the gear pump drive means 50c includes a shaft 52 connected to and extending forward from the delivery end 13c of the extruder screw. To allow clearance for this shaft, the gear pump 30c can be offsetly positioned from the extruder 10c as illustrated. The shaft 52 is provided with a suitable seal 53. Means for varying the speed of the gear pumpt 51c may optionally be included. An advantage of this embodiment is that the shaft 52 may be relatively short in length.

In the drawings and specification, there have been dislcosed typical preferred embodiments of the invention, and although specific terms are employed, they are used in a generic and descriptive sense only and not for purposes of limitation.

That which is claimed is:

1. An apparatus for accurately metering a viscous material, comprising an extruder with a positive displacement pump in tandem relation thereto for receiving extrudant from the extruder, said pump comprising two cooperatively counterrotating rotors, drive means for said extruder, and means drivingly connecting said extruder to said positive displacement pump for driving the positive displacement pump.

2. An apparatus for accurately metering a viscous material, comprising an extruder with a positive displacement pump comprising a gear pump in tandem relation thereto for receiving extrudant from the extruder, said pump comprising two cooperatively counterrotating rotors, drive means for said extruder, and means drivingly connecting said extruder to said gear pump for driving the gear pump.

3. An apparatus for accurately metering a viscous material as claimed in claim 1 or 2, wherein a filter screen is interposed between said extruder and said positive displacement pump to prevent impurities in the extrudant from reaching the positive displacement pump.

4. An apparatus as claimed in claim 1 or 2, further comprising recirculating bypass means for taking extrudant from the delivery end of said extruder screw and returning it to the intake end of said extruder screw so that the pressure of the extrudant at the delivery end of said extruder screw is equalized.

5. An apparatus for accurately metering a viscous material, comprising an extruder having an extruder screw, a positive displacement pump comprising a gear pump in tandem relation thereto to said extruder for receiving extrudant from the extruder, said pump comprising two cooperatively counterrotating rotors, drive means for said extruder, and means drivingly connecting said gear pump to the delivery end of said extruder screw for driving the gear pump.

6. An apparatus for accurately metering a viscous material, comprising an extruder having an extruder screw, a positive displacement pump comprising a gear pump connected to the delivery end of said extruder for receiving extrudant from the extruder, said pump comprising two cooperatively counterrotating rotors, drive means for said extruder, recirculating bypass means for taking extrudant from the delivery end of said extruder screw and returning it to the intake end of said extruder screw so that the pressure of the extrudant at the delivery end of said extruder screw is equalized, and means drivingly connecting said gear pump to the delivery end of said extruder screw for driving the gear pump.

7. An apparatus for accurately metering a viscous material as claimed in claim 5 or 6, wherein a filter screen is interposed between said extruder and said gear pump to prevent impurities in the extrudant from reaching the gear pump.

8. An apparatus for accurately metering a viscous material as claimed in claim 5 or 6, wherein said gear pump includes a driven gear and wherein said means drivingly connecting said gear pump to the delivery end of said extruder screw includes a drive shaft in axial alignment with said driven gear.

9. An apparatus for accurately metering a viscous material, comprising an extruder, a postitive displacement pump comprising a gear pump in tandem relation to said extruder for receiving extrudant from the extruder, drive means for said extruder, and drive means extending alongside the exterior of said extruder drivingly connecting said gear pump to said extruder drive means for driving the gear pump.

10. An apparatus for accurately metering a viscous material, comprising an extruder, a positive displacement pump comprising a gear pump connected to the delivery end of said extruder for receiving extrudant from the extruder, drive means for said extruder, recirculating bypass means for taking extrudant from the delivery end of said extruder screw and returning it to the intake end of said extruder screw so that the pressure of the extrudant at the delivery end of said extruder screw is equalized, and drive means extending alongside the exterior of said extruder drivingly connecting said gear pump to said extruder drive means for driving the gear pump.

11. An apparatus for accurately metering a viscous material as claimed in claim 9 or 10, wherein a filter screen is interposed between said extruder and said gear pump to prevent impurities in the extrudant from reaching said gear pump.

12. An apparatus for accurately metering a visous material as claimed in claim 9 or 10, wherein said drive means drivingly connecting said gear pump to said extruder includes means for varying the speed of said gear pump.

13. An apparatus for accurately metering a viscous material, comprising an extruder having an extruder screw, a positive displacement pump comprising a gear pump in tandem relation to said extruder and in offset position from the axis of said extruder for receiving extrudant from the extruder, drive means for said extruder, a shaft connected to and extending forward from the delivery end of said extruder screw, and means drivingly connecting said shaft to said offsetly positioned gear pump.

14. An apparatus for accuratley metering a viscous material, comprising an extruder having an extruder screw, a positive displacement pump comprising a gear pump in tandem relation to said extruder and in offset position from the axis of said extruder for receiving extrudant from said extruder, drive means for said extruder, recirculating bypass means for taking extrudant from the delivery end of said extruder screw and returning it to the intake end of said extruder screw so that the pressure of the extrudant at the delivery end of said extruder screw is equalized, a shaft connected to and extending forward from the delivery end of said extruder screw, and means drivingly connecting said shaft to said offsetly positioned gear pump.

15. An apparatus for accurately metering a viscous material as claimed in claim 13 or 14, wherein a filter screen is interposed between said extruder and said gear pump to prevent impurities in the extrudant from reaching the gear pump.

16. An apparatus for accurately metering a viscous material as claimed in claim 13 or 14, wherein said means drivingly connecting said shaft to said offsetly positioned gear pump includes means for varying the speed of said gear pump.

* * * * *